June 14, 1966  E. A. HAGLUND ETAL  3,255,619

SAFETY KNOB WITH COMBINATION INTERLOCK

Filed April 20, 1964  2 Sheets-Sheet 1

ELMER A. HAGLUND
DONALD W. HOWELL
IVAN L. MARBURGER
INVENTORS.

BY
Boniard J. Brown

June 14, 1966 E. A. HAGLUND ET AL 3,255,619
SAFETY KNOB WITH COMBINATION INTERLOCK
Filed April 20, 1964 2 Sheets-Sheet 2

ELMER A. HAGLUND
DONALD W. HOWELL
IVAN L. MARBURGER
INVENTORS.

BY
*Boniard I. Brown*
ATTORNEY

United States Patent Office 3,255,619
Patented June 14, 1966

3,255,619
SAFETY KNOB WITH COMBINATION
INTERLOCK
Elmer A. Haglund, 1667 Deventer St., and Donald W.
Howell, 311 Bowdoin Road, both of La Verne, Calif.,
and Ivan L. Marburger, 1315 Tulare Way, Upland,
Calif.
Filed Apr. 20, 1964, Ser. No. 360,960
7 Claims. (Cl. 70—219)

The present invention relates generally to a control stem operating knob wherein a combination interlock requires knob manipulation in accordance with a predetermined combination in order to operate the stem; more particularly, the invention relates to a unitary knob and combination lock mechanism which is normally freely rotatable relative to the stem, and wherein operative engagement or clutching of the knob relative to the stem is effected by correct manipulation of the knob in accordance with a predetermined combination.

The invention provides unitary knob and combination interlock mechanism which provides safety and anti-tampering features, in that a control stem on which the mechanism is mounted cannot be operated by unauthorized persons, but only by persons having knowledge of the predetermined combination through which the knob must be manipulated to effect operative engagement of the knob with the stem. Although devices according to the invention may be adapted to various types of handles or knobs, and is useful with a variety of equipment and appliances, such as valves, water taps, switches, and doors, the exemplary embodiment herein described comprises an operating knob for a water tap or spigot. In the preferred embodiment, the device comprises axially extending spindle means on the stem, a first opening in the spindle, a knob on the stem for operation of the stem, means providing engagement of the knob with the stem upon predetermined axial movement for rotation of the stem by means of the knob, and a rotatable position member or ring within the knob, which ring normally prevents the above-mentioned relative axial movement. The position member or ring has a second opening which is registerable with the first opening in the spindle means, and the position ring has a first axially extending lug part. A second axially extending lug part is mounted on the knob and engages the first lug part on the position ring to effect rotation of the position ring to a particular predetermined position in which the first and second openings register, and wherein the above-mentioned predetermined relative axial movement may be effected to engage the stem with the knob for rotation of the stem by the knob. Other operative features are hereinafter described in detail.

It is therefore an object of the present invention to provide a novel control stem operating knob wherein a combination interlock mechanism requires knob manipulation in accordance with a predetermined combination to operate the stem.

An object of the invention is the provision of a control stem operating knob and interlock mechanism according to the foregoing object wherein operative clutching of the knob with respect to the stem requires manipulation of the knob in accordance with a predetermined combination.

An object of this invention is to provide a control stem operating knob and interlock mechanism which cannot be operated by unauthorized persons.

It is an object of the invention to provide an operating knob and interlock mechanism in accordance with the foregoing objects, wherein means are provided to prevent operation of the combination interlock mechanism by feeling through the combination.

An object of the invention is the provision of a knob and combination interlock mechanism according to the foregoing objects, wherein the device serves as a knob for operating a control stem and as a combination lock to be operated to effect engagement of the knob with the stem for operation of the stem.

It is an object of the present invention to provide a device according to the foregoing object wherein the combination interlock mechanism is built into the knob.

An object of the invention is the provision of a knob and interlock device according to the foregoing objects which is effective for its purpose and which is substantially tamper-proof.

It is an object of this invention to provide a knob and combination interlock device for use on a control stem, which device is relatively easy and convenient to operate, and which is positive in its action.

An object of the invention is the provision of a knob and combination interlock device for use on a control stem, which device is relatively economical to fabricate, assemble and install.

Other objects, features and advantages of the present invention will become apparent to those versed in the art from a consideration of the following description, the appended claims and the accompanying drawings, wherein:

Figure 1:
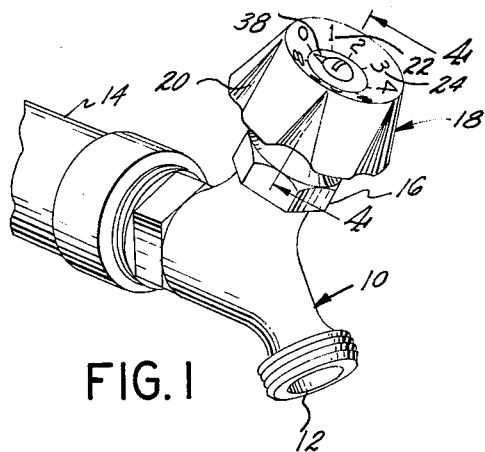
FIGURE 1 is a perspective view of a knob and combination interlock device according to the invention mounted on the stem of a water tap.

Referring to the drawings, and particularly to FIGURE 1, a water tap 10 having a nozzle portion 12 is mounted on the end of a pipe 14. A nut or fitting 16 accommodates a stem (not shown in FIGURE 1) secured to a valve within the tap 10. An operating knob or handle 18 is generally cylindrical in configuration with fluted peripheral portions 20 and a concave or dished top surface 24 on which are provided reference numerals 24 for a purpose which is hereinafter described.

Figure 2:
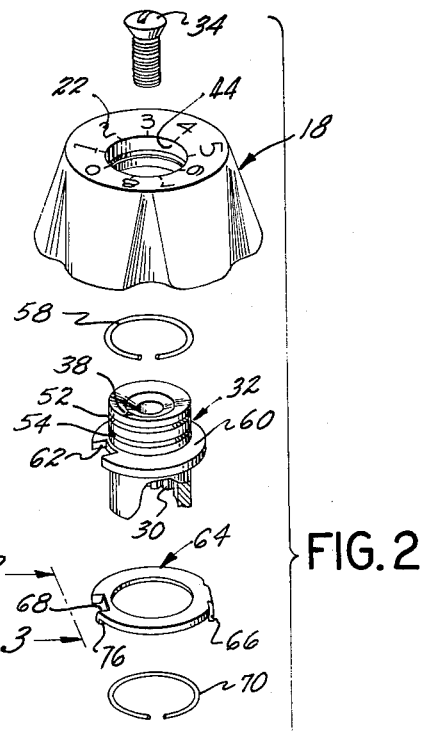
FIGURE 2 is an exploded perspective view of a knob and combination interlock device of FIGURE 1.
Figure 4:
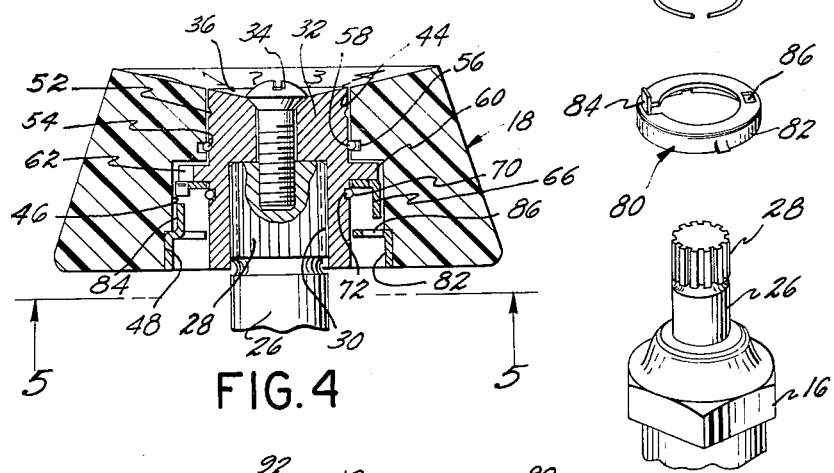
FIGURE 4 is an enlarged sectional view taken at line 4—4 in FIGURE 1.

As shown in FIGURES 2 and 4, the valve stem 26 has a splined end portion 28 which fits into and is secured in a correspondingly splined bore 30 in a spindle 32, which is further secured to the stem 26 by a screw 34. The spindle 32 is thereby secured for rotation with the stem 26 and constitutes a part of the stem. The end surface 36 of spindle 32 is concave or dished to provide an integrated upper surface of the assembly, as indicated in FIGURES 1 and 4. An index or reference marker or arrow 38 is provided on spindle surface 36 for co-operation with the combination numerals 24, as hereinafter described.

In the exemplary embodiment herein described, a two-number combination mechanism is utilized wherein the reference numerals 5 and 0 are utilized in cooperation with the reference marker 38 to effect operation of the mechanism for the engagement of knob 18 with the stem 26 for rotation of the stem. After the correct operation of the combination interlock mechanism has been completed, the knob 18 is movable axially to clutch or engage the spindle 32 of the stem for rotation of the stem 26 by means of the knob.

It will be readily appreciated that combination interlock mechanism according to the invention may be employed wherein operative combinations involving more than two reference numerals and corresponding mechanism movements may be utilized, and wherein substantially any combination of reference numerals may be employed.

Figure 10:
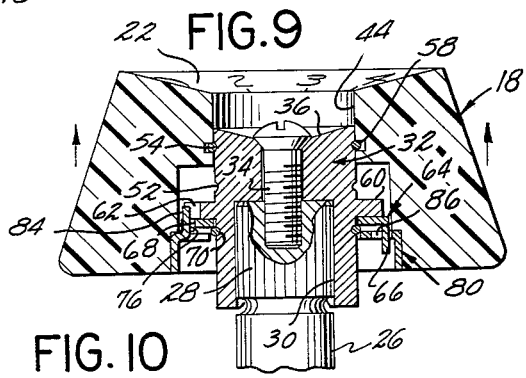
FIGURE 10 is a sectional view, similar to the view of FIGURE 4, showing the knob in a different axial position relative to the stem.

Referring to FIGURES 2 and 4, the knob 18 has a reduced bore 44, a first or intermediate counter-bore 46 and a second larger counter-bore 48. The spindle 32 of the stem is generally cylindrical and its upper portion fits within the first bore 44 of the knob. Two annular grooves 52, 54, are defined in the upper portion of the spindle. Defined in bore 44 of the knob is an annular groove 56 in which is received a snap ring, which is also received or accommodated by the annular grooves 52 and 54 in the spindle. As shown in FIGURES 4 and 10, knob 18 may be moved axially relative to the spindle 32, after operation of the combination interlock mechanism as hereinafter described, with the snap ring 58 being received in either one or the other of the annular grooves 52 and 54. There is thereby provided a positive two-position detent which establishes two axial positions of knob 18 relative to spindle 32.

A radially extending flange 60 of spindle 32 extends into the intermediate counter-bore 46 of knob 18. Flange 60 has a peripheral opening or notch 62, as indicated in FIGURES 2 and 4.

Figure 11:
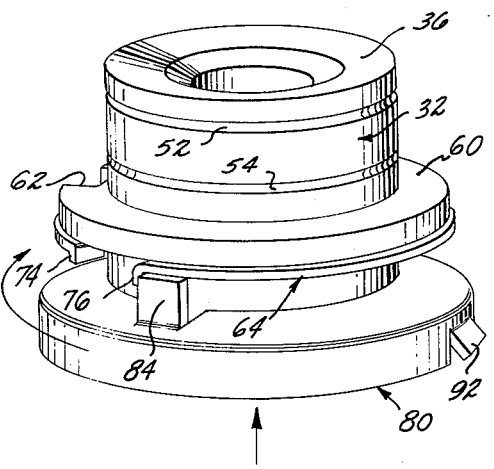
FIGURE 11 is a perspective view of the combination interlock and interengaging mechanism of FIGURES 2 through 10, with the knob omitted.

Adjacent to flange 60 in bore 46 is a position member or position ring 64 which has an axially extending part or lug 66 and a peripheral opening or notch 68, the lug and opening being diametrically opposite each other in the illustrated embodiment. Position ring 64 is rotatable relative to spindle 32, and is retained in place by a snap ring 70 which is received in an annular groove 72 in spindle 32. Two small downwardly extending antitampering ears 74, 76 extend downwardly from the radial edges of the notch or opening 68, as shown in FIGURES 2 and 11. These anti-tampering ears or tabs serve to prevent unauthorized persons from defeating the purpose of the combination interlock mechanism by tampering or feeling through the operation of the mechanism, as described hereinafter in more detail.

Figures 5, 6:
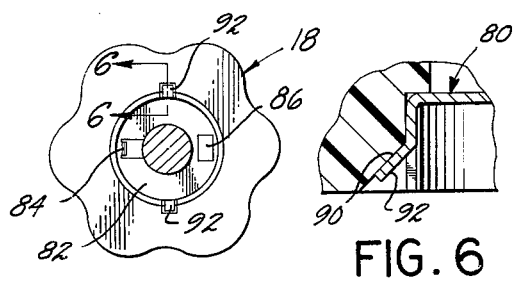
FIGURE 5 is a bottom view, taken at line 5—5 in FIGURE 4.
FIGURE 6 is an enlarged partial sectional view, taken at line 6—6 in FIGURE 5.

Referring to FIGURES 2 and 4, an actuator member or ring is disposed about the spindle 32 and has a skirt portion 82 which is press fitted in counter-bore 48 of the knob 18. An upwardly or axially extending part or lug 84 is provided on the actuator ring, and a peripheral notch or opening 86 is defined in the ring, the lug 84 and opening 86 being diametrically opposed in the embodiment herein described. As shown in FIGURE 6, counter-bore 48 is provided with inclined recesses 90 and actuator ring skirt 82 has inclined tabs 92 configurated to engage recesses 90 to provide positive securement to insure that actuator ring 80 rotates with knob 18.

The operation of the combination interlock and interengaging mechanism is illustrated in FIGURE 4 and in FIGURES 7 through 10. FIGURE 4 illustrates the positions of the components with the mechanism in "cleared" position wherein the knob 18 is freely rotatable relative to the spindle 32 and stem 26.

Figure 7:
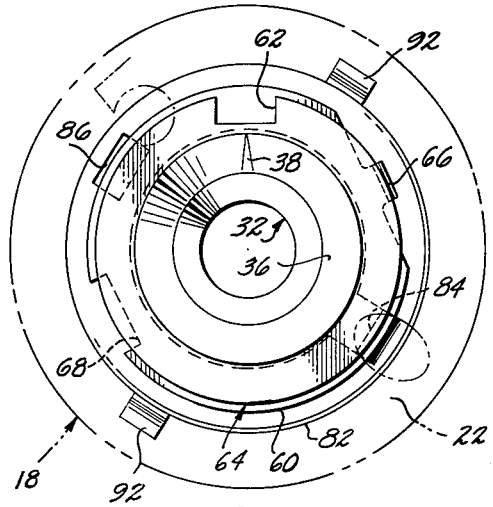
FIGURES 7, 8 and 9 are enlarged plan views of the combination interlock and interengaging mechanism of FIGURES 1 through 6, with the knob shown in phantom outline, illustrating relative positions of components in successive stages in the actuation of the combination interlock mechanism.
Figure 8:
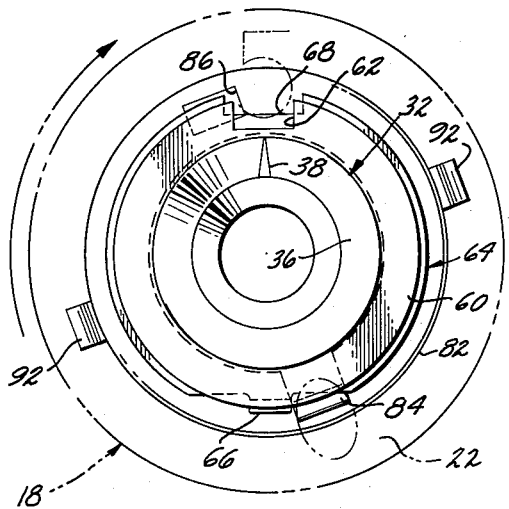

In the operation of the combination interlock mechanism, commencing with the mechanism in "cleared" status, as indicated in FIGURES 4 and 7, knob 18 is rotated clockwise as indicated by the arrow in FIGURE 8, at least one full revolution, and is then rotated clockwise until the first numeral of the combination is in registration with the reference marker or line 38. In the illustrative embodiment herein described, the first reference numeral is 5, and reference marker 38 is aligned with the numeral 5, as indicated in FIGURE 8. During this movement, the axially extending lug 84 of actuator ring 80 engages the downwardly axially extending lug 66 of position ring 64 and effects rotation of the position ring to the position wherein the notch or opening 68 of the position ring is in registration with the notch or opening 62 of flange 60 of spindle 32. The relative positions or orientations of reference marker 38, combination numeral 5, and the openings 68, 62 are such that this registration is effected.

Figure 9:
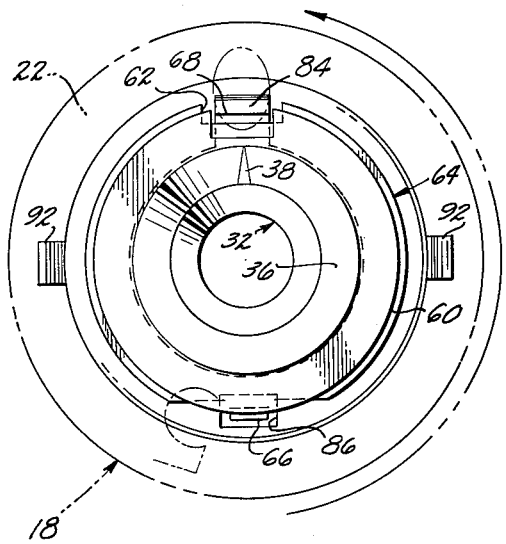

Knob 18 is next turned in a counterclockwise direction, as indicated by the arrow in FIGURE 9 until the second numeral of the combination is in registration with the reference marker 38, the second numeral being 0 in the illustrative embodiment, as illustrated in FIGURE 9. During this counterclockwise knob movement, lug 84 of actuator ring 80 moves from lug 66 of the position ring 64, and the position ring 64 does not rotate. The lug 84 of actuator ring 80 is moved into alignment or registration with opening 68 of the position ring and opening 62 of spindle 32. Opening 86 of actuator ring 80 is then in registration with lug 66 of position ring 64.

It will be understood that different combinations of reference numerals may be utilized in cooperation with reference marker 38, together with proper relative positions and orientations of the above-mentioned mechanism features, in different embodiments of the invention.

The knob 18 is then moved axially or pulled from its position shown in FIGURE 4 to its position shown in FIGURE 10, wherein lug 84 of actuator ring 80 extends through the notches or openings 68 and 62, and the lugs 66 of the position ring 64 extends through opening 86 of the actuator ring 80. By the engagement of these lugs in the openings, the knob is clutched to or engaged with the spindle 32 and stem 26 so that the stem is operable by means of the knob. That is, with the knob 18 in the axial position shown in FIGURE 10, the control stem 26 is operable by the knob. In this position, snap ring 58 is disposed in annular groove 52 of the spindle. A positive detent action is provided by the snap ring and groove, whereby an operator can determine by sense of touch when the knob is in position.

After operation of the control stem 26 by manipulation of the knob, and when it is desired to disengage the knob from operative relation with the stem, the knob is axially moved or pushed from the position shown in FIGURE 10 to the position shown in FIGURE 4, and is then preferably rotated through at least one complete revolution to effect "clearing" of the mechanism by moving openings 68 and 62 out of registration, by moving lug 84 out of registration with openings 68, 62, and by moving opening 86 out of registration with lug 66. The knob 18 is then freely rotatable relative to the spindle 32 and stem 26.

Figure 3:
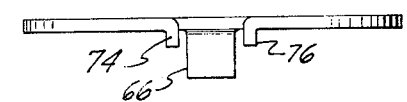
FIGURE 3 is an enlarged elevational view, taken at line 3—3 in FIGURE 2, showing details of a position ring utilized with the present invention.

As hereinbefore mentioned, the anti-tampering tabs or ears 74, 76, which are best shown in FIGURES 3 and 11, provide an anti-tampering feature of the invention. These ears serve to prevent an unauthorized person from feeling through the operation of the combination lock mechanism by sense of touch. In attempting to thus feel through the combination by touch, a person would exert axial pressure on knob 18 and rotate it to move lug 84 of the actuator ring along the under surface of position ring 64 in an effort to determine by feel when an appropriate position was reached wherein further axial movement of knob 18 could be effected by movement of lug 84 into opening 68 of the position ring. Such a feeling technique is foiled because as the lug 84 approaches the position ring opening 68, it engages one or the other of the ears 74, 76, depending upon the direction of relative movement between tab 84 and the position ring. The position ring 64 is then rotatably moved or carried around by lug 84 without lug 84 ever registering with position ring opening 68.

It will be appreciated by those skilled in the art that modifications may be made in the structure herein described without departing from the spirit and scope of the invention. For example, as hereinbefore mentioned, it is contemplated that combination interlock mechanisms can be provided wherein more than two correct movements are involved in the operation of a predetermined combination to effect engagement of the knob or handle for rotating the stem, such mechanisms being provided by the utilization of an additional ring member or ring members, similar to the position ring 64, which additional ring or rings operate in a manner generally similar to the position ring 64.

Another form of the invention would involve axial movement of the knob in a downward or inward direction rahter than in the upward or outward direction herein shown and described, in effecting clutching engagement of the knob with the spindle 32 and stem 26.

A form of the invention can be provided wherein no reference numerals are utilized, and wherein only a radial line or arrow is utilized as a reference to locate the first position into which the knob is rotated, the reference line or arrow being aligned relative to a fixed reference, such as a water pipe. After rotation of the knob 18 into this position as a step in operating the combination interlock mechanism, the knob is then rotated in the opposite direction through a predetermined angle of rotation, such as 180 degrees or other predetermined angle, in which position the knob may be moved axially to clutch or engage the stem.

In a modified form of the invention, the reference numerals 22 on the knob would be eliminated, and the knob would be provided with a spring detent arrangement or other mechanism for producing an audible "click" or a mechanical sensation at each operative position into which the knob must be rotated to effect operation of the interlock mechanism. In this modification, a reference point could be established by the omission of detents in one sector of the circle, for example 45 or 90 degrees. In operating the combination interlock mechanism, the knob would be rotated past this angular sector, and the audible clicks or mechanical sensations counted until the first operative position of the knob is reached, whereupon the knob would be rotated in the opposite direction through the appropriate number of audible clicks or mechanical sensations.

From the foregoing description, those versed in the art will appreciate that the present invention achieves the objects and realizes the advantages hereinbefore mentioned, and the invention realizes additional advantages which are apparent from the description and the drawings.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventors claim:

1. A unitary knob and combination interlock device adapted for attachment on a control stem, said device comprising a knob for operating the control stem, interengaging means on the stem and within the knob for clutching and declutching the knob relative to the stem upon a relative axial engaging movement between the knob and stem, and combination interlock means within the knob, said interlock means being positionable by rotation of the knob through predetermined clockwise and counterclockwise positions to permit said axial engaging movement between the knob and the stem to effect said clutching by said interengaging means.

2. A knob and combination interlock device according to claim 1, wherein said combination interlock means comprises a rotatable position member having an opening therein spaced from the center thereof, said combination interlock means also including means whereby the position member is rotatable to a predetermined position by the knob, and wherein said interengaging clutching means comprises means carried by the knob and extensible through the position member opening upon said axial movement of the knob, whereby the knob becomes clutched to the stem for rotation of the stem by the knob.

3. A unitary knob and combination interlock device adapted for attachment on control stem means, said device comprising a knob for operating the control stem, clutching means providing engagement between the knob and the stem for rotation together upon a predetermined relative axial movement therebetween, a rotatable and axially movable position member positioned within the knob and normally preventing said predetermined relative axial movement between the knob and the stem, and actuator means carried by the knob for rotating the position member to a predetermined position wherein the knob is axially movable to a predetermined position wherein the clutching means engages the knob with the stem to operate the stem.

4. A unitary knob and combination interlock device adapted for attachment on control stem means, said device comprising axially extending spindle means forming part of the stem means, said spindle means having a first opening therein, a knob for operating the control stem, clutching means providing engagement between the knob and the stem for rotation together upon a predetermined relative axial movement therebetween, a rotatable position member positioned within the knob and normally preventing said predetermined relative axial movement between the knob and stem, said position member having a second opening therein registerable with the first opening in the spindle means, and axially extending actuator means carried by the knob and engageable with the position member for rotating the position member to a predetermined position wherein said first and second openings are in registration and wherein the knob is axially movable to a predetermined position wherein the clutching means engages the knob with the stem means to operate the stem means.

5. A knob and combination interlock device for use on control stem means, said device comprising axially extending spindle means forming part of the stem means, said spindle means having a first opening therein, a knob for operating the control stem, means providing engagement between the knob and the stem for rotation together upon a predetermined relative axial movement therebetween, a rotatable position member positioned within the knob and normally preventing said predetermined relative axial movement between the knob and stem, said position member having a first axially extending part and having a second opening therein registerable with the first opening in the spindle means, a second axially extending part carried by the knob and engageable with said first axially extending part on the position member for rotating the position member to a predetermined position wherein said first and second openings are in registration and wherein the knob is axially movable to a predetermined position wherein the knob engages the stem means to operate the stem means, and abutment ears adjacent to said second opening in the position member, whereby upon rotational movement of said second axially extending part toward said second opening in feeling for said second opening, said second axially extending part carried by the knob engages one of said abuttment ears to carry the position member with the knob in rotational movement, whereby said second opening in the position ring cannot be located by feeling therefor.

6. A combination interlock knob for use on a control stem, comprising rotatable stem means, said stem means having a spindle part including a radially extending flange defining a first opening, a knob adapted for manual operation of the stem means, a freely rotatable position ring on the spindle part adjacent to said flange, said position ring having a second opening registerable with said first opening in the spindle flange, said flange and said position ring being positioned in a counter-bore in the knob, and axially extending actuator means mounted within a counter-bore of the knob and rotatable by the knob in a first direction to engage the position ring to position the ring in a predetermined position wherein said first opening in the ring is in registration with the second opening in the spindle flange, said knob being rotatable in a second direction to a position wherein said axially extending actuator means is aligned with said first and second registering openings to permit relative axial movement between the knob and the spindle of the stem means, whereby upon said relative axial movement the knob is clutched to the stem means for operation of the stem means by means of the knob.

7. A combination interlock knob for use on a control stem, comprising rotatable stem means, said stem means having a spindle part including a radially extending flange defining a first opening, a knob adapted for manual operation of the stem means, a freely rotatable position ring on the spindle part adjacent to said flange, said position ring having an axially extending part and having a second opening registerable with said first opening in the stem spindle flange, said flange and said position ring being positioned in a counter-bore in the knob, and axially extending actuator lug means mounted within a counter-bore of the knob and rotatable by the knob in a first direction to engage the position ring to position the ring in a predetermined position wherein said second opening in the ring is in registration with the first opening in the spindle flange, and means defining a third opening rotatably positionable by knob rotation to register with said axially extending part of the position ring, said knob being rotatable in a second direction to a position wherein said actuator means is aligned with said first and second registering openings, said third opening being so disposed relative to said axially extending actuator means that said axially extending position ring part engages the third opening upon engagement of the axially extending actuator means with said first and second openings in the spindle flange and position ring, whereby relative axial movement is permitted between the knob and the spindle of the stem means, whereby upon said relative axial movement the knob is clutched to the stem means for operation of the stem means by means of the knob.

References Cited by the Examiner
UNITED STATES PATENTS

| | | | |
|---|---|---|---|
| 1,390,322 | 9/1921 | Wayda | 70—219 |
| 1,816,575 | 7/1931 | Full | 70—219 |
| 1,843,013 | 1/1932 | Buettner | 70—219 |
| 1,913,697 | 6/1933 | Wolcott | 70—219 |
| 2,018,745 | 10/1935 | Schlitz | 70—219 |
| 2,129,228 | 9/1938 | Miller | 70—219 |

JOSEPH D. SEERS, *Primary Examiner.*
BOBBY R. GAY, *Examiner.*